(12) United States Patent
Hayakawa et al.

(10) Patent No.: US 6,402,385 B1
(45) Date of Patent: Jun. 11, 2002

(54) DYNAMIC PRESSURE BEARING APPARATUS

(75) Inventors: Masamichi Hayakawa; Hisaya Nakagawa; Michiaki Takizawa, all of Simosuwa-machi (JP)

(73) Assignee: Sankyo Seiki MFG. Co., Ltd., Nagano (JP)

(*) Notice: Subject to any disclaimer, the term of this patent is extended or adjusted under 35 U.S.C. 154(b) by 0 days.

(21) Appl. No.: 09/632,712

(22) Filed: Aug. 4, 2000

(30) Foreign Application Priority Data

Aug. 6, 1999 (JP) ............................................ 11-223317

(51) Int. Cl.$^7$ ................................................ F16C 17/02
(52) U.S. Cl. ........................ 384/114; 384/279; 384/100; 384/130; 384/450
(58) Field of Search ................................ 384/114, 100, 384/450, 279, 130

(56) References Cited

U.S. PATENT DOCUMENTS 5,944,427 A * 8/1999 Murabe et al. ............. 384/100
6,123,460 A * 9/2000 Takeuchi et al. ............ 384/100

* cited by examiner

*Primary Examiner*—Lenard A. Footland
(74) *Attorney, Agent, or Firm*—Hogan & Hartson, L.L.P.

(57) ABSTRACT

A dynamic pressure bearing apparatus comprises a rotary shaft, a sintered oil retaining bearing rotatably supporting the rotary shaft, the sintered oil retaining bearing having an interior surface defining an internal surface configuration for generating dynamic pressure to thereby form a dynamic pressure bearing between the rotary shaft and the sintered oil retaining bearing. The internal surface of the sintered oil retaining bearing comprises in a peripheral direction thereof, a minimum-gap section, a large-gap section and a separation groove section. The minimum-gap section has the minimum gap between the rotary shaft and the internal surface of the sintered oil retaining bearing. The large-gap section is continuous to the minimum-gap section, and has a larger gap between the rotary shaft and the sintered oil retaining bearing than that at the minimum-gap section to thereby increase pressure of lubrication oil that is present between the rotary shaft and the sintered oil retaining bearing toward the minimum-gap section. The separation groove section is provided between the large-gap section and the minimum-gap section. The separation groove section has a gap greater than that of the large-gap section. The minimum-gap section and the large-gap section define a dynamic pressure bearing surface section. The minimum-gap section is located at a predetermined angular position with respect to the separation groove section in a manner that a ratio between an arc angle defined by the dynamic pressure bearing surface section and the predetermined angular position of the minimum-gap section is 1:0 through 0.2. Furthermore, a maximum gap in the large-gap section with respect to the rotary shaft is two times or less greater than a minimum gap at the minimum-gap section with respect to the rotary shaft.

14 Claims, 10 Drawing Sheets

| LEVEL | NUMBER OF ARCS | MINIMUM GAP | MAXIMUM GAP AT LARGE-GAP SECTION | GAP RATIO | MEASURED BEARING LOSS | CALCULATED BEARING LOSS | LOSS RATIO | JUDGEMENT |
|---|---|---|---|---|---|---|---|---|
| | | μm | μm | | Watt | Watt | | |
| 1 | 3 | 4 | 8 | 2 | 0.9 | 1.1 | 0.8181818 | ○ |
| 2 | 5 | 4 | 6 | 1.5 | 0.95 | 1 | 0.95 | ○ |
| 3 | 3 | 4 | 16 | 4 | 0.4 | 0.9 | 0.4444444 | × |
| 4 | 3 | 4 | 12 | 3 | 0.55 | 0.95 | 0.5789474 | × |
| 5 | 5 | 4 | 16 | 4 | 0.6 | 0.9 | 0.6666667 | × |
| 6 | 5 | 4 | 8 | 2 | 0.8 | 0.95 | 0.8421053 | ○ |
| 7 | 5 | 4 | 4 | 1 | 0.2 | 1.15 | 0.173913 | × |

FIG. 2

ARC ANGLE RELATIVE RATIO = LOCATION OF MINIMUM GAP SECTION FROM SEPARATION GROOVE SECTION (GAP RATIO = 1.72)

DYNAMIC PRESSURE BEARING APPARATUS

BACKGROUND OF THE INVENTION

1. Field of the Invention

The present invention relates to dynamic pressure bearing apparatuses that may be used in high rotational precision apparatuses and equipment, such as, magnetic disc drive apparatuses, optical disc drive apparatuses, polygon mirror rotary drive apparatuses, cylinder rotary drive apparatuses for VTR, and the like.

2. Description of Related Art

Herringbone type dynamic pressure bearing apparatus is known as a dynamic pressure bearing apparatus. This apparatus has a rotary shaft and a sleeve that supports the rotary shaft. Herringbone-shaped dynamic pressure grooves are provided on at least one of an external surface of the rotary shaft and an internal surface of the sleeve. Lubricant such as oil or the like is provided between the rotary shaft and the sleeve to form a dynamic pressure bearing between the rotary shaft and the sleeve. The dynamic pressure bearing rotatably supports the rotary shaft.

In manufacturing the herringbone type dynamic pressure bearing apparatus described above, a sleeve is made of a material of good workability such as brass, bronze and the like. The internal surface of the sleeve is subject to a cutting work to provide a finish with a high precision. Further, an additional work needs to be performed on either of the internal surface of the sleeve or an external surface of the rotary shaft to provide herringbone-shaped dynamic pressure grooves. Accordingly, this results in a higher cost.

In this respect, the Japanese laid-open patent application HEI 9-200998 describes a dynamic pressure bearing that uses a sintered metal. This technique is advantageous because a dynamic pressure bearing can be manufactured at a lower cost. An outline of the invention of the above-described publication will be described below.

In the conventional technique described in the publication, a rotary shaft of a spindle motor is supported by a slide bearing having a radial bearing section. The slide bearing is a sintered oil retaining bearing in which a lubricant is provided in a gap between an internal surface of the bearing and an external surface of the rotary shaft. The internal surface of the bearing has a concentric arc surface and an eccentric surface, provided respectively at three locations. The concentric arc surface is concentric with the center of the bearing and determines a minimum-gap section of the gap. The eccentric arc surface is eccentric with respect to the center of the bearing and connects to the concentric arc surface in a manner that the gap gradually narrows in a rotational direction of the rotary shaft. Arc angle θ2 of the concentric arc surface is 0.05–0.1 in ratio with respect to arc angle θ1 of the eccentric arc surface. The maximum gap at the eccentric arc surface with respect to the rotary shaft is 2–6 times greater than the minimum gap.

The dynamic pressure bearing described in the publication is a type called a multiple-arc bearing. Most of the multiple-arc bearings are used for relatively large equipment. There are few cases in which this type of bearing is used in small equipment such as small spindle motors, and the like. The multiple-arc bearing formed by a sintered material, such as the one described above, is provided with relatively simple longitudinal grooves (extending in the axial direction) for generating dynamic pressure. Accordingly, this type of grooves can be formed by pressing an appropriate tool to a sinterable material when forming or re-pressurizing the sinterable material. Therefore, a multiple-arc bearing can be manufactured with generally the same cost as required by a conventional ordinary sintered oil retaining bearing.

On the other hand, the dynamic pressure bearing described in the publication tends to cause oil leak because of reasons described below, and therefore has problems in its stability and reliability.

It is noted that herringbone type dynamic pressure grooves in a herringbone type dynamic pressure bearing push in oil from both sides of the dynamic pressure grooves in an axial direction of the shaft toward a center thereof to thereby generate dynamic pressure. As a result, the grooves have a strong control over the movement of the oil toward the center side of the grooves, such that oil leakage is difficult to occur. However, the multiple-arc type dynamic pressure bearing made of a sintered material does not generate a control force over the movement of oil toward a center of the shaft in its axial direction. As a result, the oil tends to leak from both ends of the bearing.

Multiple-arc bearings for large sized apparatuses are generally provided with oil circulation systems and periodical oil supply systems. However, a dynamic pressure bearing for small sized apparatuses, such as, small sized spindle motors, does not have a space to install such auxiliary systems as described above.

Further, the dynamic pressure bearings described in the aforementioned publications use a magnetic fluid as a lubrication oil for generating dynamic pressure, and is equipped with a magnetic circuit provided at an end section of the bearing to prevent oil leak. Such a structure imposes restrictions on the lubrication oil, and results in a large sized oil leak prevention mechanism and thus a higher cost.

SUMMARY OF THE INVENTION

The present invention is made to solve the problems of the conventional technique described above. It is an object of the present invention to provide a dynamic pressure bearing apparatus having a rotary shaft and a sintered oil retaining bearing that is provided with a novel internal surface for generating dynamic pressure. In accordance with one aspect of the present invention, a dynamic pressure bearing is effectively formed between the rotary shaft and the sintered oil retaining bearing with substantially no oil leakage. It is also an object of the present invention to provide a low cost, reliable and highly stable dynamic pressure bearing apparatus having a sintered oil retaining bearing with a novel internal surface that effectively prevents oil leak from end portions of the bearing and provides a required dynamic pressure.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 2 is a graph showing results of experiments on the relation between various internal surface configurations of the sintered oil retaining bearing and oil leaks.

DETAILED DESCRIPTION OF EMBODIMENTS

A dynamic pressure bearing apparatus in accordance with an embodiment of the present invention is described with reference to FIGS. 1 and 2.

Figure 1:
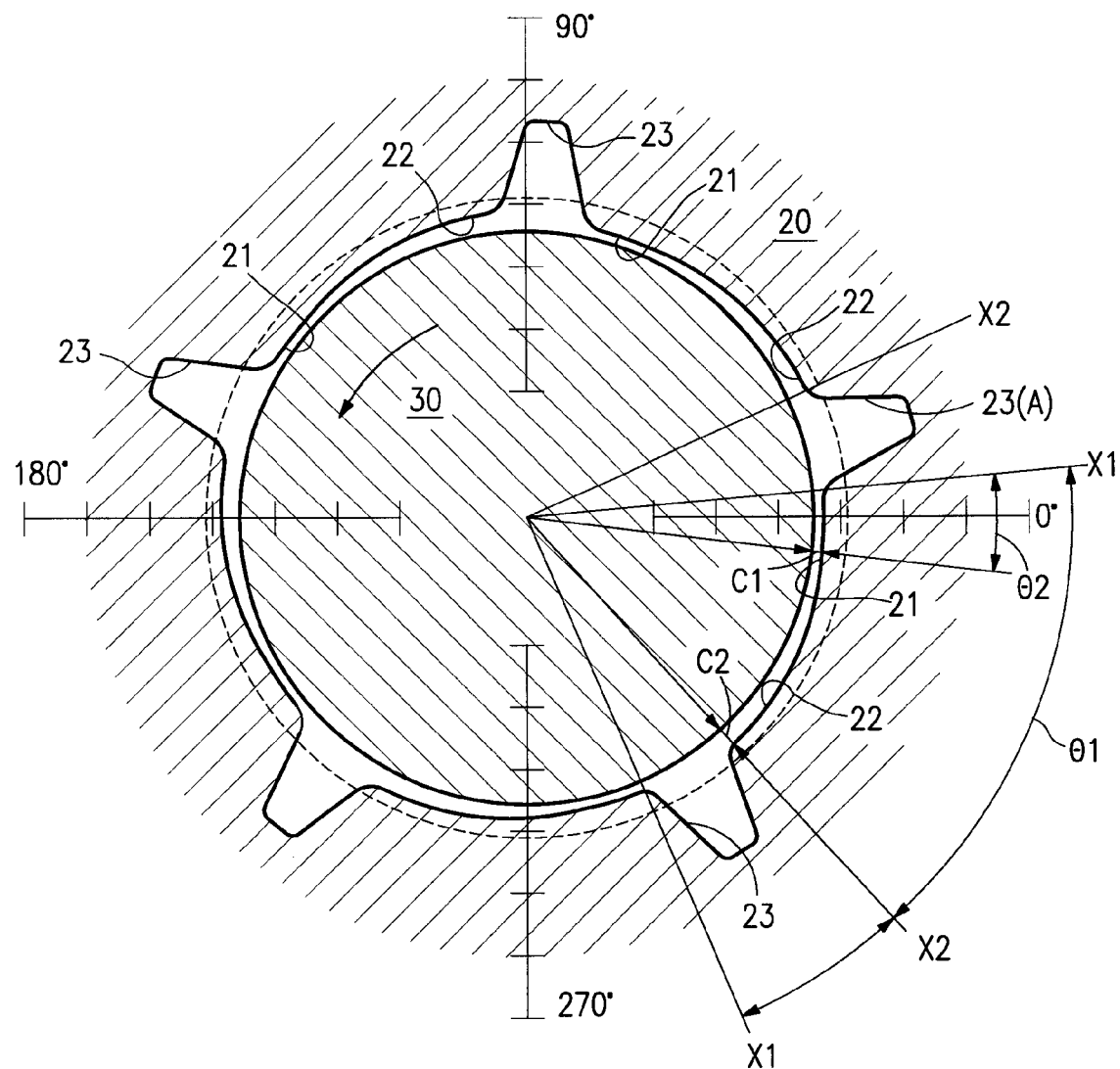
FIG. 1 is a cross-sectional view of a dynamic pressure bearing apparatus in accordance with one embodiment of the present invention.

FIG. 1 shows a sintered oil retaining bearing 20 and a rotary shaft 30. The sintered oil retaining bearing 20 is formed by molding a sinterable metal. The molded sinterable metal contains numerous pores. The pores of the sintered member contain lubrication oil. The sintered oil retaining bearing 20 is provided with a central bore along its central axis. (FIG. 1 shows only a central hole that defines an internal surface of the bearing.) The rotary shaft 30 is inserted in the central hole of the bearing, such that the rotary shaft 30 is rotatably supported by the bearing. The sintered oil retaining bearing has an internal surface that generates dynamic pressure, such that a dynamic pressure bearing is formed between the rotary shaft 30 and the sintered oil retaining bearing 20. The dynamic pressure bearing generates a dynamic pressure action to rotatably support the rotary shaft 30, whereby a dynamic pressure bearing apparatus is thus formed.

An internal surface of the sintered oil retaining bearing 20 (more specifically, a peripheral surface of the central hole of the sintered oil retaining bearing 20, as shown in a cross-sectional view in a plane perpendicular to a central axis of the sintered oil retaining, bearing 20 shown in FIG. 1) has at least a minimum gap section 21, a large gap section 22 and a separation groove section 23. The minimum-gap section 21 and the large-gap section 22 form one dynamic pressure bearing section. The separation groove section 23 separates one dynamic pressure bearing section from another dynamic pressure bearing section. The minimum gap section 21 has a minimum gap between the rotary shaft 30 and the internal surface of the sintered oil retaining bearing 20. The large gap section 22 is continuous with the minimum-gap section 21 and has gaps that gradually narrow toward the minimum gap section 21 such that lubrication oil between the rotary shaft 30 and the sintered oil retaining bearing 20 increases its pressure toward the minimum gap section 21. Also, the large-gap section 22 has a gap between the rotary shaft 30 and the sintered oil retaining bearing 20 greater than that of the minimum-gap section 21. The separation groove section 23 is provided between the large gap section 22 and the minimum gap section 21 and has a gap between the rotary shaft 30 and the internal surface of the sintered oil retaining bearing 20 greater than that of the large gap section 22

It is noted that gaps at the minimum-gap section 21 where the gap between the rotary shaft 30 and the internal surface of the sintered oil retaining bearing 20 is minimum and gaps at the large-gap section 22 where the gap between the rotary shaft 30 and the internal surface of the sintered oil retaining bearing is greater than that of the minimum-gap section 21 will be described as ideal gaps, in other words, designed gaps.

The minimum-gap section 21 and the large-gap section 22 form one dynamic pressure bearing section. In the embodiment shown in FIG. 1, five sets of dynamic pressure bearing sections, each composed of the minimum-gap section 21 and the large-gap section 22, are provided in a peripheral direction about the rotary shaft at equal intervals. The separation groove sections 23 are formed in a manner that the dynamic pressure bearing sections are divided by the separation groove sections. The gap from the external surface of the rotary shaft 30 at the separation groove section 23 is greater than the gap from the external surface of the rotary shaft 30 at the large-gap section 22.

The minimum-gap section 21 is located at a predetermined angular position with respect to the separation groove section 23 in a manner that a total arc angle $\theta 1$ defined by the dynamic pressure bearing surface section and the predetermined angular position of the minimum-gap section is set at ratios between 1:0 and 1:0.2. In one embodiment, the minimum gap in the minimum-gap section 21 is located at a predetermined angular position with respect to the separation groove section 23 in a manner that a total arc angle $\theta 1$ defined by the dynamic pressure bearing surface section and the predetermined angular position of the minimum-gap section is set at ratios between 1:0 and 1:0.2. Referring to FIG. 1, the total arc angle $\theta 1$ corresponds to an area between a boundary of one of the separation groove sections and a boundary of the next one of the separation groove sections.

Details will be described with reference to FIG. 1. A separation groove section 23(A) is located in front of one dynamic pressure bearing section in a rotational direction of the rotary shaft 30. A boundary X1 is defined at a location between the separation groove section 23(A) and the one dynamic pressure bearing section. An arc angle $\theta 2$ is defined between the boundary X1 and the minimum-gap section 21 of the one dynamic pressure bearing. The arc angle $\theta 2$ and the arc angle $\theta 1$ are set at ratios between 1:0 and 1:0.2.

The separation groove section 23(A) is defined between a center X2 of a transitional area between an adjacent large-gap section 22 and the separation groove section 23(A) and a center X1 of a transitional area between the separation groove section 23(A) and the dynamic pressure bearing section including the minimum-gap section 21. Each of the separation groove sections 23 is similarly defined.

When a gap between the bearing 20 and the rotary shaft 30 provided at the minimum-gap section 21 is defined as C1, and a maximum gap between the bearing 20 and the rotary shaft 30 provided at the large-gap section 22 is defined as C2, the gap C1 is set at 2 times or less greater than the gap C2. It is noted that the maximum gap C2 is defined between the internal surface of the bearing 20 and the external surface of the rotary shaft 30 at a center X2 in the transitional area between the large-gap section 22 and the separation groove section 23. In other words, the gap at the large-gap section with respect to the rotary shaft 30 is set at two times or less greater than the gap at the minimum-gap section 21 with respect to the rotary shaft 30. The reasons why the gap at the large-gap section is set at two times or less greater than that at the minimum-gap section will be described below.

When the rotary shaft 30 rotates clockwise as indicated by an arrow shown in FIG. 1, the lubrication oil that is present between the rotary shaft 30 and the sintered oil retaining bearing 20 flows in the rotational direction. The lubrication oil flows in a wedge-shaped space along the large-gap section 22 toward the minimum-gap section 21. The wedge-shaped space is defined by gaps that gradually narrow toward the minimum-gap section 21. Therefore, the oil pressure of the lubrication oil present between the rotary shaft 30 and the sintered oil retaining bearing 20 is gradually increased. The oil pressure of the lubrication oil acts as a dynamic pressure to rotatably support the rotary shaft without having a metallic contact with the sintered oil retaining bearing 20.

The embodiment shown in FIG. 1 is one type of multiple-arc dynamic pressure bearing. A conventional multiple-arc dynamic pressure bearing likely causes oil leaks, as described above. The conventional multiple-arc dynamic pressure bearing causes oil leaks mainly due to the following three reasons:

(1) A large negative pressure is generated in a gap in the bearing, such that air contained in the lubrication oil is separated from the oil and expands to push out the lubrication oil;

(2) With the rotation of the rotary shaft, the lubrication oil moves along the large-gap section toward the minimum-gap section. When a size-reduction rate of a wedge-shaped space that is defined between the large-gap section and the external surface of the rotary shaft is too high, the lubrication oil that can not enter the small gap flows out in the axial direction; and (3) The rotary shaft may cause an unstable rotation with a swinging motion (half-speed swing rotation), such that the movement of the rotary shaft pushes the lubrication oil in the axial direction.

Countermeasures against the causes of all of the types of oil leaks described above need to be provided. In the conventional technique, arc angles of the concentric arc surfaces are made smaller and gap differences of the eccentric arc surface with respect to the rotary shaft are made greater, as countermeasures against the causes (1) and (3) above. However, independent and different countermeasures are required against the cause (2).

In contrast, the inventors of the present invention balanced the positions and the gap ratios of the minimum-gap section 21 (where the gap between the rotary shaft 30 and the internal surface of the sintered oil retaining bearing 20 becomes the minimum) and the large-gap section 22 (where the gap with respect to the rotary shaft 30 is set greater than that at the minimum-gap section 21). As a result, a bearing apparatus is provided with effective countermeasures against all of the causes.

FIG. 2 shows a part of results of experiments conducted by the inventors.

Referring to FIG. 2, when the loss ratio is 1.0, there is no oil leak, and therefore the loss ratio closer to 1.0 presents better countermeasures against oil leaks. Generally, the loss ratio at 0.8 or greater presents good countermeasures against oil leaks. In FIG. 2, levels 1, 2 and 6 satisfactorily meet the conditions. It can be said from the results that, when the gap at the minimum-gap section 21 between the sintered oil retaining bearing 20 and the rotary shaft 30 is set at two times or less greater than the gap at the large-gap section 22 between the sintered oil retaining bearing 20 and the rotary shaft 30, favorable results as generally designed can be obtained.

While the gap at the minimum-gap section 21 between the sintered oil retaining bearing 20 and the rotary shaft 30 is set at 2 times or less greater than the gap at the large-gap section 22 between the sintered oil retaining bearing 20 and the rotary shaft, experiments are conducted to find optimum positions of the minimum-gap section 21. As a result, it has been discovered that when the minimum-gap section 21 is set at an angular position with respect to the separation groove section in a manner that the angular position of the minimum-gap section 21 and an arc angle $\theta 1$ defined by one dynamic pressure bearing section are set at ratios of 1:0 through 1:0.2, oil leaks are effectively prevented. It is noted that the position "0" is located at a boundary between the separation groove section and the minimum-gap section 21, more specifically, at the central position X1 in a transitional section between the separation groove section and the minimum-gap section 21. In other words, when the minimum-gap section 21 is located at the position "0", it is located at the central position X1.

In the experimental results shown in FIG. 2, it has been found that the following conditions generally result in the maximum effective countermeasures against oil leaks.

Diameter of the rotary shaft: 3 mm

The number of multiple arcs: 5

The minimum gap: 4 $\mu$m

Eccentric arc maximum gap: 6 $\mu$m

Concentric arc angle (at the minimum-gap section 21): 10 degree each

Eccentric arc angle (at the large-gap section 22): 52 degree each

Angle of separation groove that separates adjacent dynamic pressure bearing sections: 10 degree each Depth of the separation groove: 20 $\mu$m In accordance with the embodiment described above, a dynamic pressure bearing apparatus comprises a rotary shaft 30 and a sintered oil retaining bearing 30 rotatably supporting the rotary shaft 30. The sintered oil retaining bearing 20 has an interior surface defining an internal surface configuration for generating dynamic pressure to thereby form a dynamic pressure bearing between the rotary shaft 30 and the sintered oil retaining bearing 20. In the dynamic pressure bearing apparatus, the internal surface of the sintered oil retaining bearing comprises in a peripheral direction thereof, a minimum-gap section 21, a large-gap section 22 and a separation groove section 23. The minimum-gap section 21 has the minimum gap between the rotary shaft 30 and the internal surface of the sintered oil retaining bearing 20. The large-gap section 22 is continuous to the minimum-gap section 21, and has a larger gap between the rotary shaft 30 and the sintered oil retaining bearing 20 than that at the minimum-gap section 21 to thereby increase pressure of lubrication oil that is present between the rotary shaft and the sintered oil retaining bearing toward the minimum-gap section. The separation groove section 23 is provided between the large-gap section 22 and the minimum-gap section 21. The separation groove section 23 has a gap between the rotary shaft 30 and the sintered oil retaining bearing 20 greater than that of the large-gap section 22. The minimum-gap section 21 and the large-gap section 22 define a dynamic pressure bearing surface section. The minimum-gap section is located at a predetermined angular position with respect to the separation groove section 23 in a manner that a ratio between an arc angle defined by the dynamic pressure bearing surface section and the predetermined angular position of the minimum-gap section 21 is 1:0 through 1:0.2. Furthermore, a maximum gap in the large-gap section with respect to the rotary shaft 30 is two times or less greater than a minimum gap at the minimum-gap section 21 with respect to the rotary shaft 30. As a result, the internal surface configuration of the sintered oil retaining bearing 20 is well balanced to provide good countermeasures against oil leaks. Also, due to the internal surface configuration of the sintered oil retaining bearing 20 according to the present invention, a dynamic pressure bearing apparatus can prevent oil leaks without having to provide a special oil leak prevention mechanism such as a magnetic fluid seal, and a low cost and stable dynamic pressure bearing apparatus with a sintered oil retaining bearing can be provided.

It is noted that the large-gap section 22 may have any configuration that smoothly connects to the minimum-gap section 21. Therefore, the large-gap section 22 may be formed in a curved configuration or a linear configuration. The number of multiple arcs, in other words, the number of dynamic pressure bearing sections may be three or more in a peripheral direction of the rotation. However, three or five dynamic pressure bearing sections would be preferable.

Figure 3:
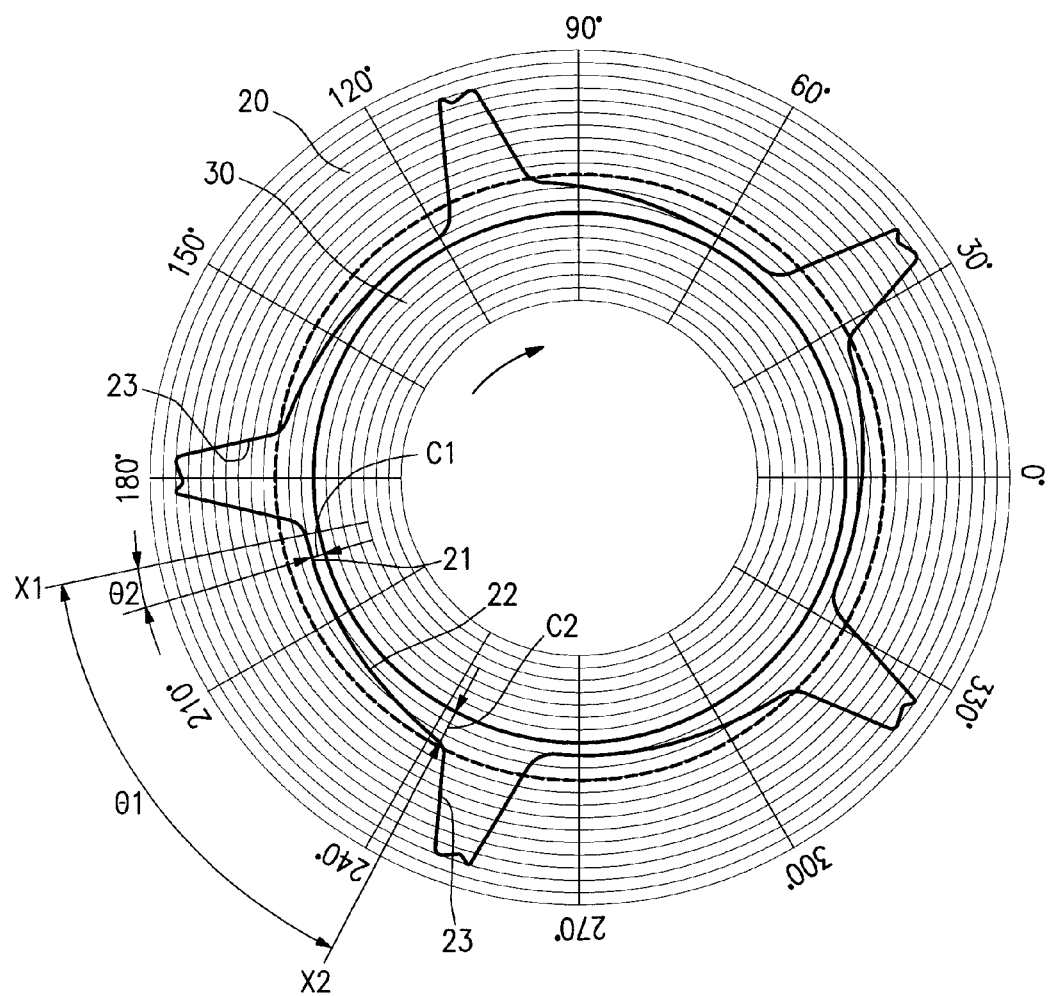
FIG. 3 is a cross-sectional view of a dynamic pressure bearing apparatus in accordance with another embodiment of the present invention.
Figure 4:
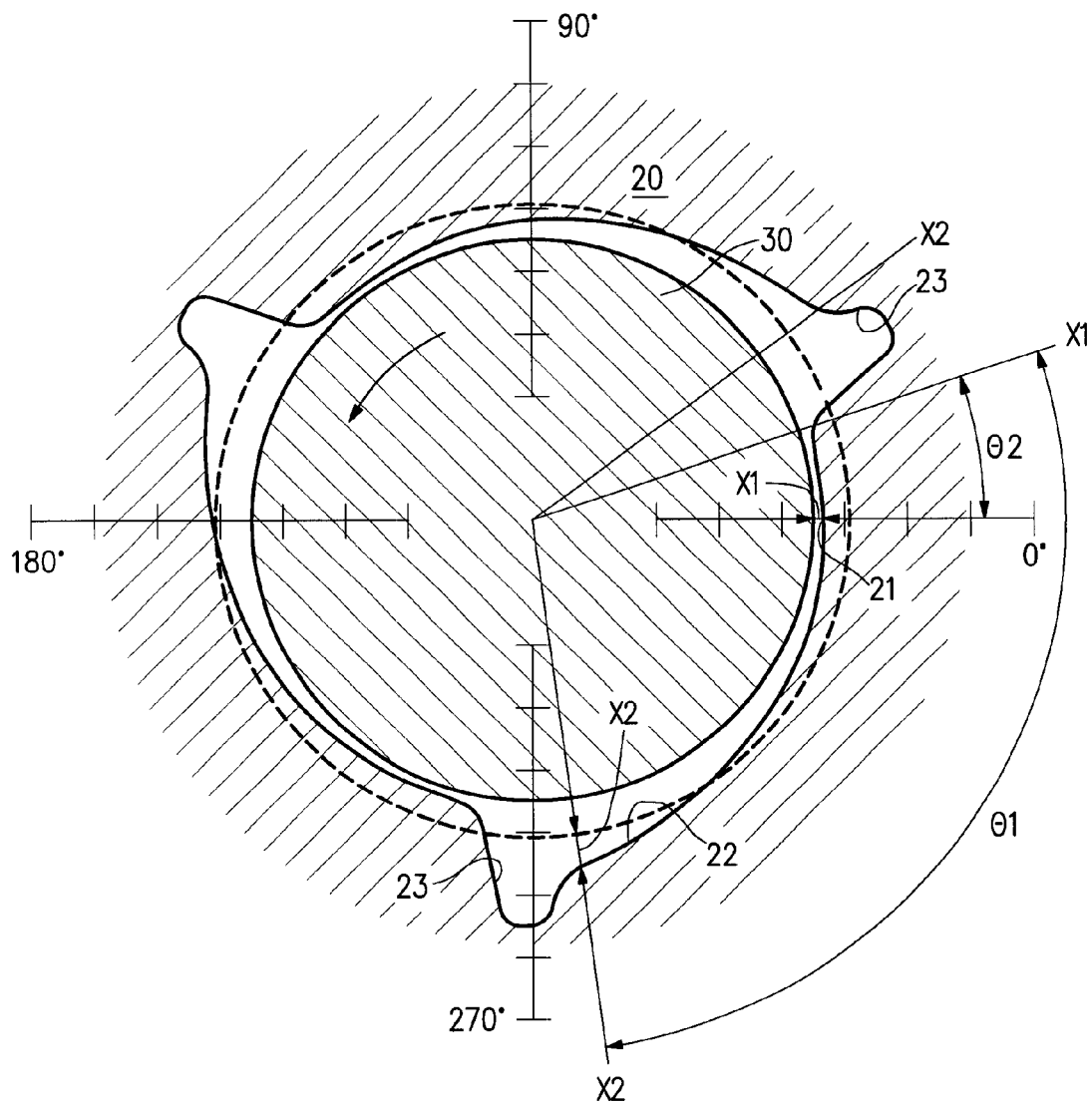
FIG. 4 is a cross-sectional view of a dynamic pressure bearing apparatus in accordance with still another embodiment of the present invention.

FIGS. 3 and 4 shows another embodiment of the present invention. FIG. 3 shows an example that is provided with five dynamic pressure bearing sections arranged in a peripheral direction at equal intervals. FIG. 4 shows an example that is provided with three dynamic pressure bearing sections arranged in a peripheral direction at equal intervals. In FIGS. 3 and 4, the reference number 20 denotes a sintered oil retaining bearing, the reference number 21 denotes a minimum-gap section, the reference numeral 22 denotes a large-gap section, the reference number 23 denotes a separation groove section, respectively. Also, in a similar manner as defined in the embodiment shown in FIG. 1, when a gap between the minimum-gap section 21 and the rotary shaft 30 is C1, and the maximum gap between the large-gap section 22 and the rotary shaft 30 is C2, more specifically, the maximum gap between the large-gap section 22 and the external surface of the rotary shaft 30 at the center of a transitional section between the large-gap section 22 and the separation groove section 23, is C2, C2 is set at two times or less greater than C1. Moreover, when one of the dynamic pressure bearing sections defines an arc angle θ1, and an angular distance of the minimum-gap section 21 between a boundary of the large-gap section 22 and the one dynamic pressure bearing section and the minimum-gap section 21 that forms the one dynamic pressure bearing section defines an arc angle θ2, the minimum-gap section 21 is set such that the arc angle θ1 and the arc angle θ2 are set at ratios of 1:0 through 1:0.2.

In the embodiments shown in FIGS. 3 and 4, C1 and C2, and θ1 and θ2 are set to have the relations described above. As a result, the embodiments provide similar effects as obtained by the embodiment shown in FIG. 1.

Figure 5:
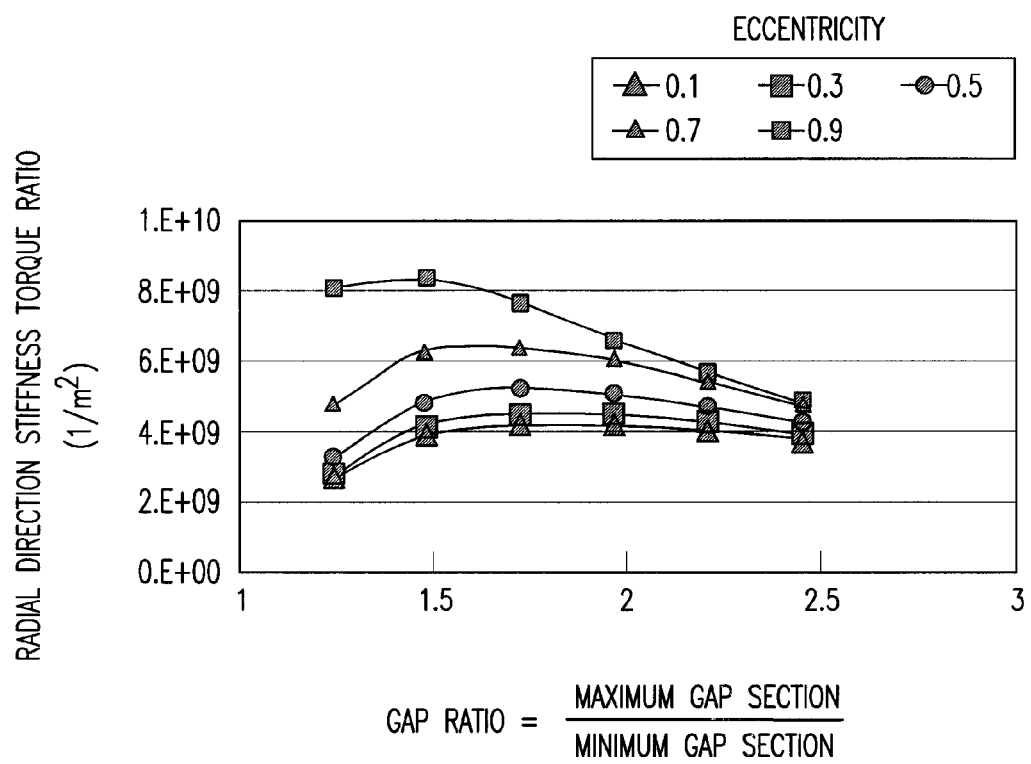
FIG. 5 is a graph showing changes in the radial direction stiffness torque ratio when the gap ratio of the dynamic pressure bearing apparatus is changed.
Figure 6:
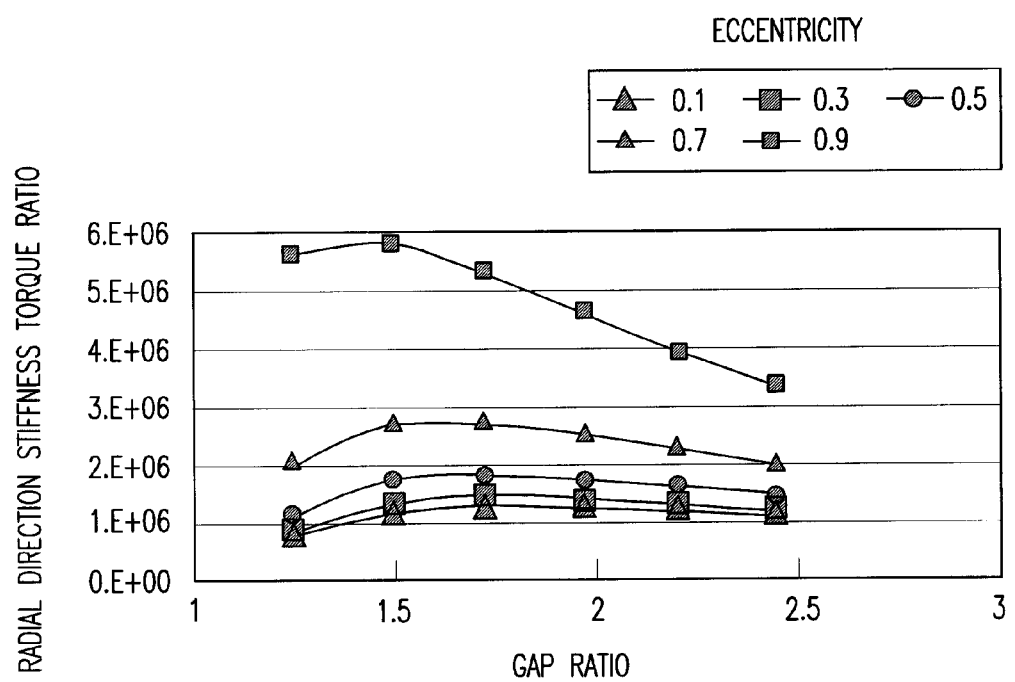
FIG. 6 is a graph showing changes in the radial direction stiffness when the gap ratio of the dynamic pressure bearing apparatus is changed.

FIG. 5 is a graph showing changes in the radial direction stiffness torque ratio when the ratio between the separation at the minimum-gap section 21 between the bearing and the rotary shaft 30 (the minimum gap) and the maximum gap at the large-gap section 22, in other words, the gap ratio, are changed. FIG. 6 is a graph showing changes in the radial direction stiffness that corresponds to the actual dynamic pressure, when the gap ratios are changed. It is noted that eccentricities are used as parameters in the tests. The eccentricity is a value obtained by dividing a distance between the center of the bearing and the center of the rotary shaft by a gap in a radial direction. Therefore, when the rotary shaft is in contact with the bearing, the eccentricity is 1.0. When the rotary shaft is held in the center of the bearing by a dynamic pressure, the eccentricity is zero (0).

As shown in FIGS. 5 and 6, changes in the radial direction stiffness torque ratio and changes in the radial direction stiffness for changes in the eccentricities become smaller, as the gap ratio becomes greater. In a high eccentricity state, the rotary shaft substantially vibrates (i.e., moves in lateral directions) as the dynamic pressure of the bearing gives in the eccentric load applied to the rotary shaft. If the radial direction stiffness does not become sufficiently large when the eccentricity becomes larger for the same gap ratio, lateral movements of the rotary shaft cannot be suppressed, in other words, the rotary shaft cannot be readily pushed back to its rotational center. In this respect, the maximum gap at the large-gap section is preferably set two times or less greater than the minimum gap at the minimum-gap section, and more preferably, at 1.9 times or less greater than the minimum gap.

On the other hand, it is observed from FIG. 5 that the radial direction stiffness torque ratio lowers when the gap ratio becomes less than 1.5. Since the radial direction stiffness ratio is an indicator of the efficiency of a dynamic pressure bearing, a lowered stiffness torque ratio means a lowered efficiency of the dynamic pressure bearing. In consideration of the efficiency of the dynamic pressure bearing, the gap ratio may preferably be set at 1.4 or greater, and more preferably, at 1.5 or greater.

Figure 7:
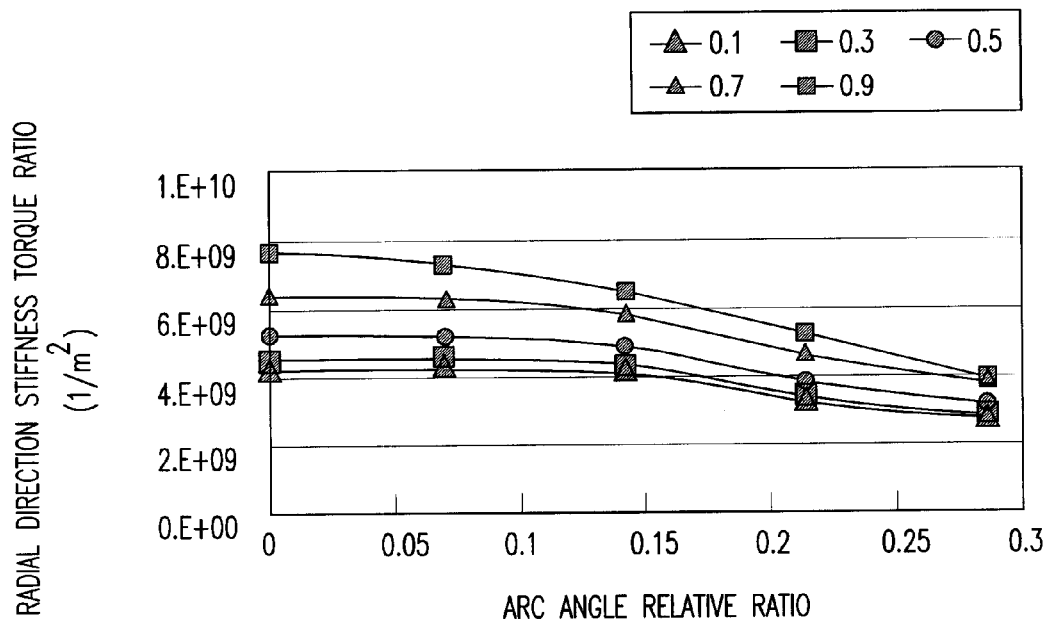
FIG. 7 is a graph showing changes in the radial direction stiffness ratio when the arc angle relative ratio of the dynamic pressure bearing apparatus is changed.

Next, FIG. 7 is a graph showing relations between the arc angle ratio (the position of the minimum-gap section measured from the separation groove section) and the radial direction stiffness torque ratio, when the gap ratio is set at 1.72 and the eccentricity is used as a parameter. When the arc is angle ratio becomes greater, the radial direction stiffness ratio becomes smaller, and changes in the radial direction stiffness ratio also become smaller. It is noted that the arc angle ratio at 0.2 or greater does not provide good results.

Figure 8:
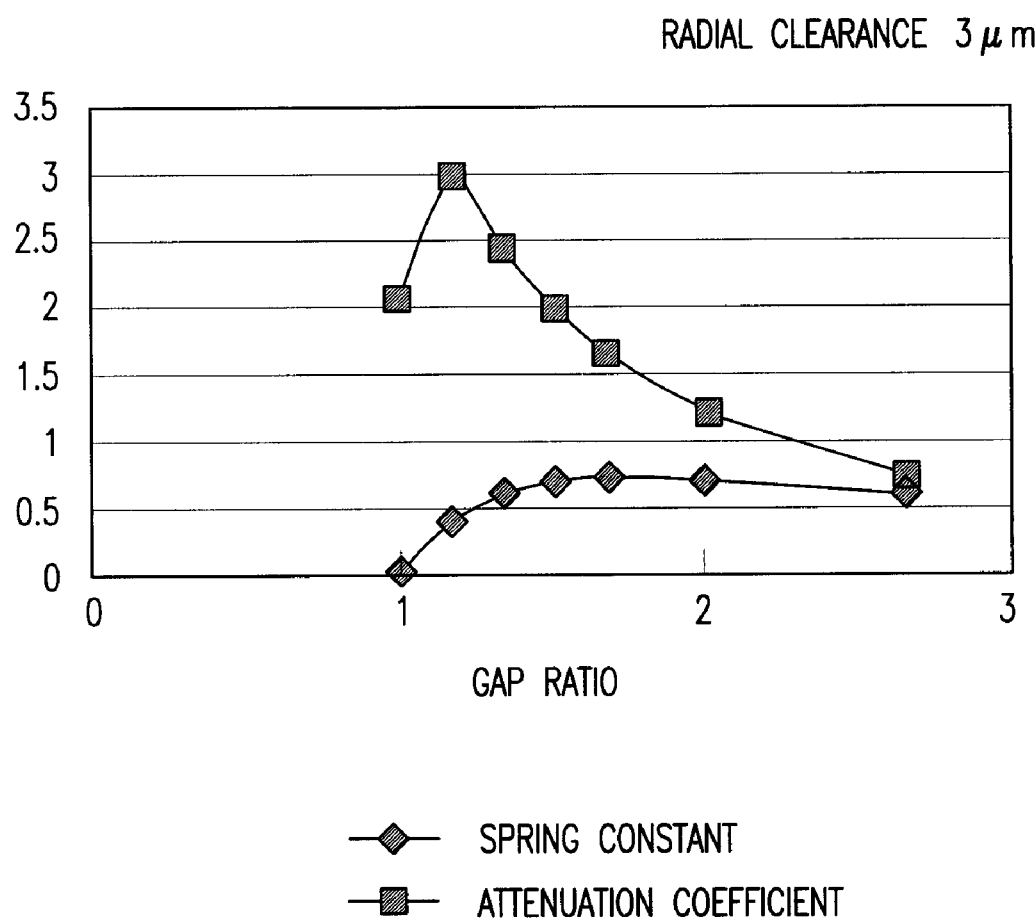
FIG. 8 is a graph showing changes in the spring constant and the attenuation coefficient when the gap ratio of the dynamic pressure bearing apparatus is changed.

Next, FIG. 8 is a graph showing changes in the spring constant that corresponds to the radial direction stiffness of the bearing and changes in the attenuation coefficient that represents the effectiveness in absorbing vibrations. It is observed from FIG. 8 that the spring constant reaches its peak value when the gap ratio is close to 1.2, and sharply lowers as the gap ratio exceeds 1.2. However, the attenuation coefficient reaches its peak when the gap ratio is close to 1.8, and lowers when the gap ratio is either greater or smaller than 1.8. Both of the spring constant and the attenuation coefficient are important as the bearing characteristics. Therefore, considering the balance between the two, the gap ratio is preferably set between 1.4 and 2.0.

Figure 9:
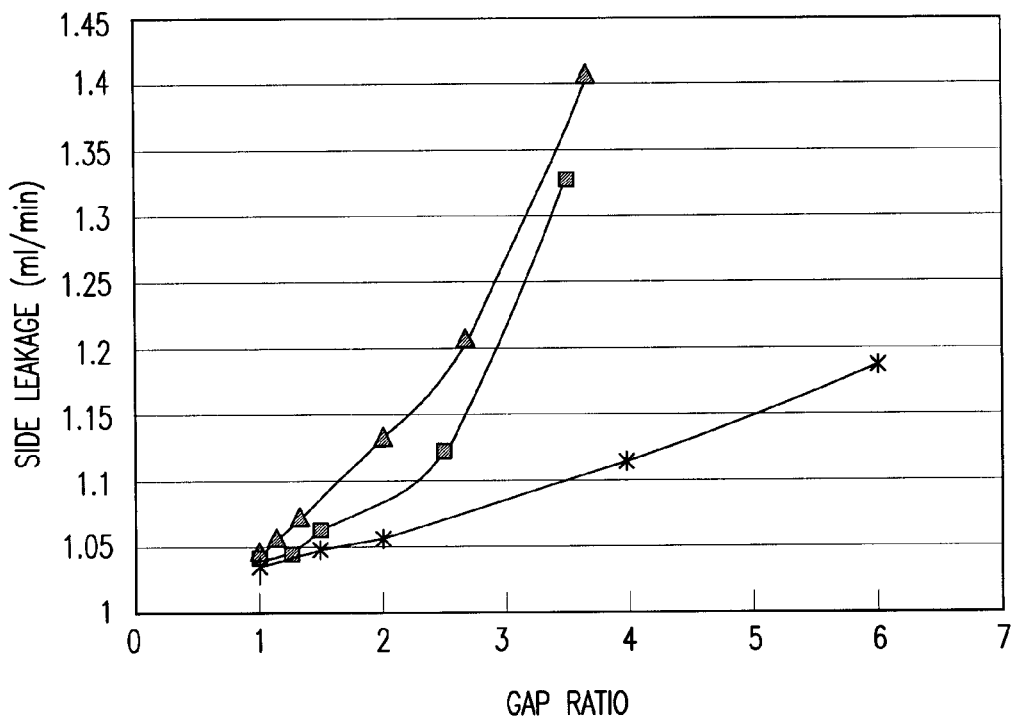
FIG. 9 is a graph showing changes in the amount of oil leaks when the gap ratio of the dynamic pressure bearing apparatus is changed.
Figure 9:
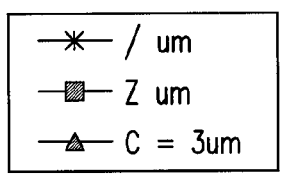
Figure 10:
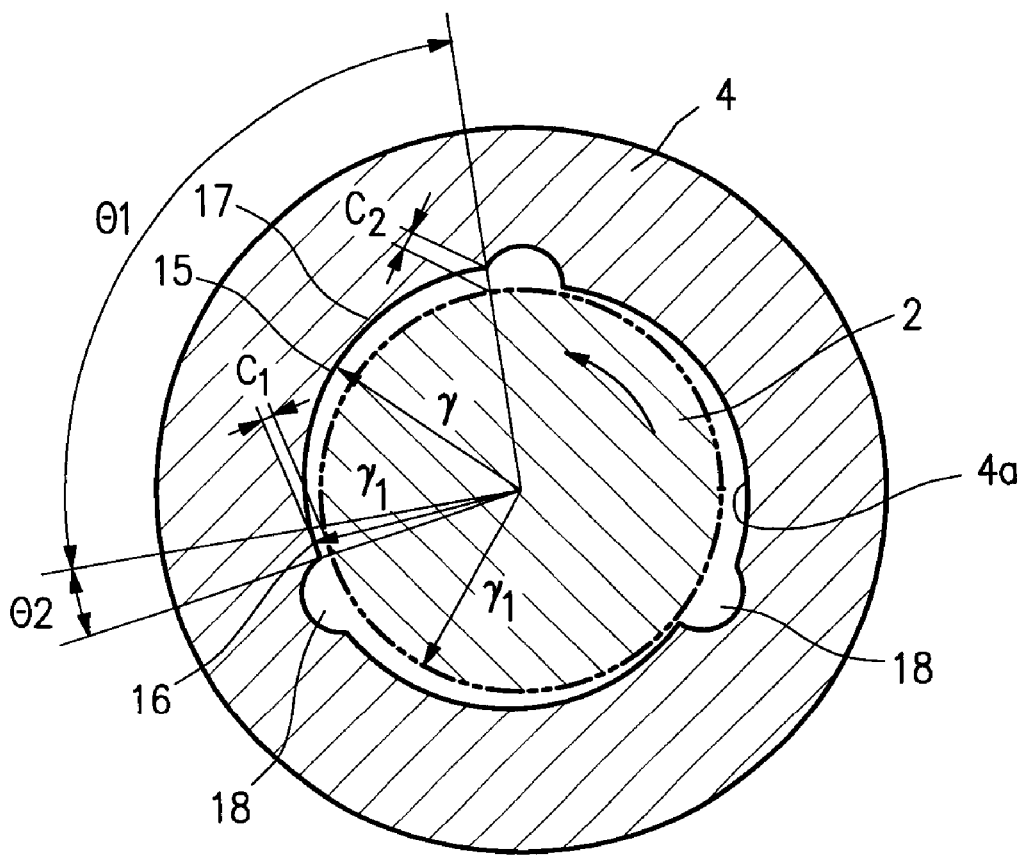
FIG. 10 is a cross-sectional view of a conventional dynamic pressure bearing apparatus.

FIG. 9 is a graph showing the relation between the gap ratio and the amount of oil leaks. As the gap ratio increases, and as clearances in the radial direction increase, the amount of oil leaks increases. In particular, when the gap ratio is 2 or greater, the amount of oil leaks sharply increases.

It is noted that, when a half or more of the total number of dynamic pressure bearing sections meat the conditions for the minimum-gap section 21 and the large-gap section 22 described above, the practically required characteristics may be attained. For example, if three of the dynamic pressure bearing sections in the case of the embodiment shown in FIG. 1, and two of the dynamic pressure bearing sections in the embodiment shown in FIG. 4, meat the requirements described above, the remaining dynamic pressure bearing sections may be formed in simple arc shapes.

In accordance with the embodiments of the present invention described above, in a dynamic pressure bearing apparatus, the internal surface of the sintered oil retaining bearing comprises in a peripheral direction thereof, a minimum-gap section, a large-gap section and a separation groove section. The minimum-gap section and the large-gap section define a dynamic pressure bearing section. The minimum-gap section has the minimum gap between the rotary shaft and the internal surface of the sintered oil retaining bearing. The large-gap section is continuous to the minimum-gap section, and have a larger gap between the rotary shaft and the sintered oil retaining bearing than that at the minimum-gap section to thereby increase pressure of lubrication oil that is present between the rotary shaft and the sintered oil retaining bearing toward the minimum-gap section. The separation groove section is provided between the large-gap section and the minimum-gap section, and has a gap greater than that of the large-gap section 22.

The minimum-gap section is located at a predetermined angular position with respect to the separation groove section in a manner that a ratio between an arc angle defined by the dynamic pressure bearing surface section and the predetermined angular position of the minimum-gap section is 1:0 through 1:0.2. Furthermore, a maximum gap in the large-gap section between the rotary shaft and the sintered oil retaining bearing is two times or less greater than a minimum gap at the minimum-gap section between the rotary shaft and the sintered oil retaining bearing. As a result, the internal surface configuration of the sintered oil retaining bearing is well balanced to provide good countermeasures against oil leaks. Also, due to the internal surface configuration of the sintered oil retaining bearing according to the present invention, a dynamic pressure bearing apparatus can prevent oil leaks without having to provide a special oil leak prevention mechanism such as a magnetic fluid seal. As a result, a low cost and stable dynamic pressure bearing apparatus with a sintered oil retaining bearing can be provided.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A dynamic pressure bearing apparatus comprising:
    a rotary shaft; and
    a sintered oil retaining bearing rotatably supporting the rotary shaft, the sintered oil retaining bearing having an interior surface defining an internal surface configuration for generating dynamic pressure to thereby form a dynamic pressure bearing between the rotary shaft and the sintered oil retaining bearing,
    wherein the internal surface of the sintered oil retaining bearing comprises in a peripheral direction thereof:
    a minimum-gap section having a minimum gap between the rotary shaft and the internal surface of the sintered oil retaining bearing;
    a large-gap section continuous to the minimum-gap section, the large-gap section having a larger gap between the rotary shaft and the sintered oil retaining bearing than that at the minimum-gap section to thereby increase pressure of lubrication oil that is present between the rotary shaft and the sintered oil retaining bearing toward the minimum-gap section; and
    a separation groove section between the large-gap section and the minimum-gap section, the separation groove section having a gap greater than that of the large-gap section,
    wherein the internal surface of the sintered oil retaining bearing is provided with a plurality of dynamic pressure bearing surface sections, each being defined by the minimum-gap section and the large-gap section,
    the minimum-gap is located, in the peripheral direction, at a predetermined angular position with respect to a boundary between the separation groove section and the dynamic pressure bearing surface section in a manner that a ratio of an arc angle defined by the dynamic pressure bearing surface section to the predetermined angular position of the minimum-gap section is set between 1:0 and 1:0.2, and
    a maximum gap in the large-gap section is two times or less greater than a minimum gap at the minimum-gap section.

2. A dynamic pressure bearing apparatus according to claim 1, wherein a ratio between the minimum gap at the minimum-gap section and the maximum gap in the large-gap section is set at 1.4 or greater but less than 2.

3. A dynamic pressure bearing apparatus according to claim 2, wherein a ratio between the minimum gap at the minimum-gap section and the maximum gap in the large-gap section is set at 1.4 or greater but 1.9 or smaller.

4. A dynamic pressure bearing apparatus according to claim 2, wherein the sintered oil retaining bearing is formed from a molded sintered metal.

5. A dynamic pressure bearing apparatus according to claim 2, wherein the minimum-gap section, the large-gap section and the separation groove section formed in the internal surface of the sintered oil retaining bearing are formed at uniform intervals in a rotational direction along the rotary shaft.

6. A dynamic pressure bearing apparatus according to claim 5, wherein the large-gap section is formed to have gaps gradually reducing toward the minimum-gap section.

7. A dynamic pressure bearing apparatus according to claim 5, wherein the separation groove section is formed between the minimum-gap section and the large-gap section and has a gap with respect to the rotary shaft greater than a maximum reference gap with respect to the rotary shaft that is formed by the large-gap section, and
    a boundary between the separation groove section and the minimum-gap section is located at a predetermined angular position with respect to a boundary between the separation groove section and the dynamic pressure bearing surface section in a manner that a ratio between an arc angle defined by the dynamic pressure bearing surface section and the predetermined angular position of the minimum-gap section with respect to a boundary defined at the maximum reference gap formed in the large-gap section is between 1:0 and 1:0.2.

8. A dynamic pressure bearing apparatus comprising:
    a rotary shaft; and
    a bearing rotatably supporting the rotary shaft,
    wherein the bearing comprises:
    a minimum-gap section having a minimum gap between the rotary shaft and the bearing;
    a large-gap section continuous to the minimum-gap section, the large-gap section having a larger gap between the rotary shaft and the bearing than a gap at the minimum-gap section; and
    a separation groove section between the large-gap section and the minimum-gap section, the separation groove section having a gap between the rotary shaft and the bearing greater than a gap at the large-gap section, wherein the internal surface of the bearing is provided with a plurality of dynamic pressure bearing surface sections, each being defined by the minimum-gap section and the large-gap section, the minimum-gap is located, in the peripheral direction, at a predetermined angular position with respect to a boundary between the separation groove section and the dynamic pressure bearing surface section in a manner that an arc angle defined by the dynamic pressure bearing surface section and the predetermined angular position of the minimum-gap are set at ratios between 1:0 and 1:0.2, and a maximum gap in the large-gap section is two times or less greater than a minimum gap at the minimum-gap section.

9. A dynamic pressure bearing apparatus according to claim 8, wherein a ratio between the minimum gap at the minimum-gap section and the maximum gap in the large-gap section are set at 1.4 or greater but less than 2.

10. A dynamic pressure bearing apparatus according to claim 9, wherein a ratio between the minimum gap at the minimum-gap section and the maximum gap in the large-gap section are set at 1.4 or greater but 1.9 or smaller.

11. A dynamic pressure bearing apparatus according to claim 10, wherein the sintered o retaining bearing is formed from a molded sintered metal.

12. A dynamic pressure bearing apparatus according to claim 10, wherein the minimum-gap section, the large-gap section and the separation groove section formed in the internal surface of the sintered oil retaining bearing are formed at uniform intervals in a rotational direction along the rotary shaft.

13. A dynamic pressure bearing apparatus according to claim 12, wherein the large-gap section is formed to have gaps gradually reducing toward the minimum-gap section.

14. A dynamic pressure bearing apparatus according to claim 12, wherein the separation groove section is formed between the minimum-gap section and the large-gap section and has a gap between the rotary shaft and the bearing greater than a maximum gap between the rotary shaft and the bearing that is formed at the large-gap section, and a boundary between the separation groove section and the minimum-gap section is located at a predetermined angular position with respect to a boundary between the separation groove section and the dynamic pressure bearing surface section in a manner that a ratio between an arc angle defined by the dynamic pressure bearing surface section and the predetermined angular position of the minimum-gap section with respect to a boundary defined at the maximum reference gap formed in the large-gap section is set between 1:0 and 1:0.2.

\* \* \* \* \*